Patented Aug. 18, 1953

2,649,445

UNITED STATES PATENT OFFICE 2,649,445

CHLORACETIC ACID ESTER OF DIPHENYL ETHANOLS

Merrill E. Speeter, Syracuse, N. Y., assignor to Bristol Laboratories, Syracuse, N. Y., a corporation of New York No Drawing. Application February 28, 1948, Serial No. 12,141

4 Claims. (Cl. 260—247.2)

This invention relates to a new class of organic compounds of therapeutic value and to methods for the preparation thereof. More particularly the invention relates to new organic carbinols, esters thereof, and to the acid addition salts of such carbinols and esters.

The free bases of the new compounds may be represented by the following general formula:

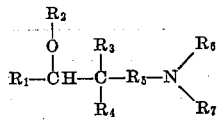

wherein $R_1$ represents an aliphatic hydrocarbon radical (e. g., methyl, ethyl, propyl, isopropyl, allyl, butyl, secondary butyl, isobutyl, butenyl, amyl, methallyl, tertiary-butyl, crotyl, ethallyl, heptyl, isoheptyl, octyl, decyl, isoamyl, hexyl, etc.); $R_2$ represents hydrogen, a lower aliphatic hydrocarbon radical, and radicals having the following structure:

$$X-\overset{O}{\underset{\|}{C}}-$$

where X stands for an aliphatic hydrocarbon radical, aryl (e. g., phenyl, fluorenyl, anthryl, phenanthryl, xenyl, naphthyl, etc.), aliphatic substituted aryl (e. g., tolyl, xylyl, ethylphenyl, propylphenyl, isopropylphenyl, allylphenyl, 2-butenylphenyl, tertiary-butylphenyl, etc.), aryl substituted aliphatic (e. g., benzyl, phenylethyl, benzohydryl, phenylisopropyl, cinnamyl, etc.); alkoxy (e. g., ethoxy, propoxy, butoxy, etc.), aryloxy (e. g., phenoxy, etc.), aralkoxy (e. g., benzyloxy, phenylethoxy, phenylisopropoxy, etc.), alkamino (e. g., methylamino, ethylamino, cyclopentylamino, etc.), arylamino (e. g., benzylamino, phenylamino, tolylamino, diphenylamino, dibenzylamino, and homologues thereof); $R_3$ and $R_4$ represent aryl radicals, aliphatic substituted aryl, aryl substituted aliphatic, cycloalkyl (e. g., cyclohexyl, cyclopentyl, cyclooctyl, etc.), heterocyclic (e. g. $\alpha$, $\beta$, and $\gamma$, pyridyl, $\alpha$, $\beta$ and $\gamma$, pyrimidyl and $\alpha$, $\beta$, thienyl, and their homologues, as well as those groups with one or more of their hydrogen atoms substituted by a halogen, more particularly chlorine, bromine, fluorine or iodine. Specific examples of halogen-substituted hydrocarbon radicals are chlorophenyl, dichlorophenyl, chlorocyclohexyl, etc.; $R_5$ is a straight or branched chain alkylene residue containing 1 to 6 carbon atoms; $R_6$ and $R_7$ may be hydrogen, an alkyl group (saturated or unsaturated) containing 1 to 6 carbon atoms, and

Y representing the atoms necessary to complete a heterocyclic ring system (e. g., morpholinyl, piperidyl, pyrrolidyl, etc.), and homologues thereof. This invention also includes all of the isomers of the above compounds.

The acid addition salts of these compounds are also included within the present invention. Some examples of the acid addition salts of the base with inorganic or organic acids which may be prepared by the methods hereinafter described are the hydrochloride, hydrobromide, hydroiodide, sulfate, phosphate, maleate, acetate, citrate, oxalate, succinate, benzoate, tartrate, phthalate and the like.

The new compounds are useful for therapeutic applications, many possessing analgetic and antispasmodic activity. These compounds are also useful as intermediates in the preparation of other organic compounds.

The basically substituted carbinols may be prepared by reducing the corresponding ketones, and the esters obtained by the acylation of the carbinols.

The present invention also includes compounds which serve as intermediates in the production of the above compounds and to methods for the preparation of the same.

The following examples will serve to illustrate the invention without limiting it thereto, all parts being by weight unless otherwise indicated.

*Example 1*

The preparation of 2-dimethylamino-4,4-diphenyl-5-heptanol as the free base having the following formula:

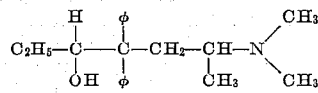

Twenty grams (0.06 mole) of amidone hydrochloride dissolved in 100 ml. of distilled water was shaken in a Parr catalytic reduction apparatus under 55 pounds pressure with 0.25 gm. Adam's platinum oxide catalyst. In three hours the theoretical uptake of hydrogen was observed. The solution was filtered, made basic and extracted with ether. The ether extracts were dried over potassium carbonate and then concentrated. Last traces of ether were removed under reduced pressure. The oil slowly crystallized on scratching and cooling. The material was then dissolved in boiling Skellysolve C and cooled. Large (half centimeter) crystals slowly separated. These melted at 100–101°. Yield 16.7 grams, 90%.

Calculated for $C_{21}H_{29}NO$:

|   | Calculated | Found |
| --- | --- | --- |
| C | 80.95 | 80.80 |
| H | 9.37 | 9.34 |

Example 2

The preparation of 2-dimethylamino-4,4-diphenyl-5-heptanol hydrochloride having the following formula:

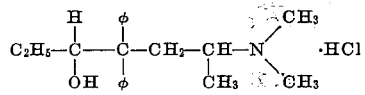

Ten grams (0.03 mole) of amidone hydrochloride was dissolved in 100 ml. of distilled water. The solution was placed in a reduction bottle and 0.5 grams of Adam's platinum oxide catalyst introduced. The compound was then hydrogenated at room temperature (22° C.) using a Burgess-Parr apparatus with an initial hydrogen pressure of 55 pounds. In two hours a pressure drop was observed which indicated absorption of hydrogen corresponding to that theoretically required for reduction of the carbonyl group. The reduction was stopped, the catalyst filtered off, and the filtrate concentrated to a volume of 10 to 15 ml. On cooling, crystals separated which were purified through a second recrystallization from water followed by recrystallization from isopropanol. The resulting white crystalline powder melted at 194–195°.

Calculated for $C_{21}H_{29}NO \cdot HCl$:

|   | Calculated | Found |
| --- | --- | --- |
| C | 72.47 | 72.2 |
| H | 8.68 | 8.56 |
| N | 4.03 | 3.99 |

Example 3

The preparation of 2-dimethylamino-4,4-diphenyl-5-heptanol by the use of lithium-aluminum hydride having the formula:

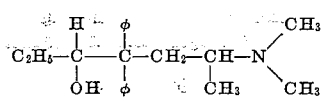

A solution of 12 gm. (0.039 mole) of amidone base in 300 ml. dry ether was added dropwise to a solution of 1.4 gm. (0.04 mole) of lithium aluminum hydride in 250 ml. of dry ether. Some exothermic reaction was noted and the mixture refluxed gently. After the addition, the mixture was refluxed for 18 hours and was then cooled in an ice-salt bath. Small pieces of ice were added over a 30 minute period until no reaction was evident with liberation of hydrogen. The mixture was then poured into a beaker containing 200 ml. of 20% sodium hydroxide. After stirring well the mixture was transferred to a separatory funnel and the layers separated. The ether layer was dried over potassium carbonate while the water layer was extracted with 800 ml. of ether in three portions. The combined dried ether solutions were concentrated and the residual oil crystallized at once. The crystals were dissolved in hot Skellysolve C and cooled. The crystals which separate melted at 96–98°. A second recrystallization from Skellysolve C gave a product which melted at 101–102° and also melted undepressed at this temperature with an authentic sample of 2-dimethylamino-4,4-diphenyl-5-heptanol prepared by catalytic reduction.

Example 4

The preparation of 2-dimethylamino-4,4-diphenyl-5-acetoxyheptane hydrochloride having the formula:

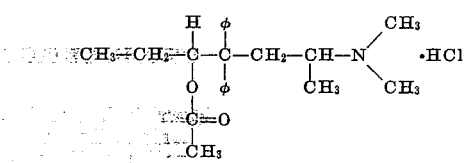

A solution of 2 gm. (0.06 mole) of 2-dimethylamino-4,4-diphenyl-5-heptanol in 100 ml. of dry ether was treated with 1 ml. of acetyl chloride. The mixture was cooled in an ice bath and was protected from moisture with a calcium chloride drying tube. The white precipitate which slowly separated was recrystallized from ethyl acetate. The precipitate melted at 208–210° after some sintering at 200°. A second recrystallization from ethyl acetate gave crystals melting sharply at 213–214°. Yield 1 gm.

Calculated for $C_{23}H_{31}NO_2 \cdot HCl$:

|   | Calculated | Found |
| --- | --- | --- |
| C | 70.7 | 70.3 |
| H | 8.28 | 8.38 |

Example 5

The preparation of 2-dimethylamino-4,4-diphenyl-5-benzoyloxyheptane hydrochloride having the formula:

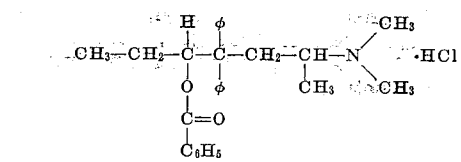

One gram of the carbinol (0.032 mole) in 100 ml. of dry ether was treated with 1 gm. of benzoyl chloride (excess). On standing 12 hours white crystals separated which were filtered off and recrystallized from ethyl acetate, M. P. 135–136°. Additional recrystallizations raised the melting point slowly to 148–150°. However, recrystallization from water gave very well formed crystals melting at 135–136° which were evidently hydrated. Yield 0.78 gm.

Calculated for $C_{28}H_{33}NO_2HCl \cdot H_2O$:

|   | Calculated | Found |
| --- | --- | --- |
| C | 71.5 | 71.3 |
| H | 7.70 | 7.42 |

Example 6

The preparation of 2-dimethylamino-4,4-diphenyl-5-phenylacetoxyheptane hydrochloride having the formula:

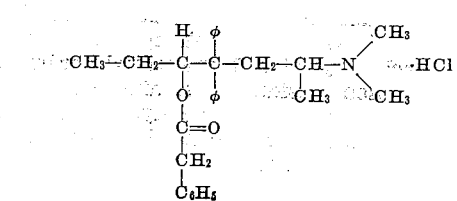

Six grams of (0.02 mole) of 2-dimethylamino-4,4-diphenyl-5-hexanol was dissolved in 50 ml. of dry benzene. To this solution was added 6 gm. (excess) of phenylacetyl chloride. The resulting mixture became warm spontaneously and was refluxed one hour to complete the reaction. The benzene was distilled off and 50 ml. of ether added. On standing in the cold room with occasional scratching crystals slowly formed in the oily lower layer. These were filtered off and recrystallized from ethyl acetate; the material melted at 170–172°. A second recrystallization from the same solvent gave 5.7 gm. of crystals melting at 172–173°.

Calculated for $C_{29}H_{35}NO_2 \cdot HCl$:

|   | Calculated | Found |
|---|---|---|
| C | 74.71 | 74.40 |
| H | 7.79 | 7.92 |

Example 7

The preparation of 2-dimethylamino-4,4-diphenyl-5-propionoxyheptane hydrochloride having the formula:

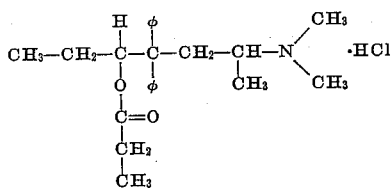

Six grams (0.02 mole) of crystalline 2-dimethylamino-4,4-diphenyl-5-heptanol was dissolved in 50 ml. of dry benzene and refluxed for 2 hours with 3.7 gm. (0.04 mole) or propionyl chloride. In 30 minutes after heating was begun the flask was filled with a crystalline precipitate. The reaction mixture was cooled and the crystals filtered off. This material melted at 185–186° after recrystallization from isopropanol. It was found the material melted and resolidified when immersed in a melting point bath pre-heated to 150°. This indicated the product was solvated. Yield 5 gm.

Calculated for $C_{24}H_{33}NO_2 \cdot HCl$, mol. wt. 403.73 (dried sample):

|   | Calculated | Found |
|---|---|---|
| C | 71.34 | 70.90, 71.10 |
| H | 8.48 | 8.55, 8.29 |

Example 8

The preparation of 2-dimethylamino-4,4-diphenyl-5-heptanol N-phenyl-carbamate hydrochloride having the formula:

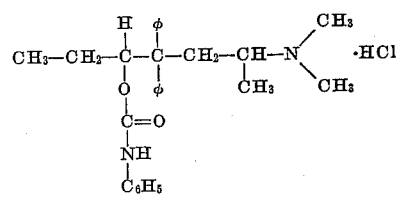

Ten grams (0.03 mole) of amidone hydrochloride was reduced according to the method of Example 1. The ether extract of the alcohol obtained through that procedure was dried over potassium carbonate and filtered. To the solution was added 5 gm. (excess) of phenylisocyanate. Some light colored crystals separated in 12 hours which melted, after recrystallization from ethyl alcohol, at 238–239°. Through a mixed melting point determination with an authenic sample, this product was shown to be diphenylurea. The supernatant ether layer above the crystals was extracted with 4 normal hydrochloric acid (300 ml.). These extracts on standing in the cold deposited needle crystals. These melted at 148–150°. A second recrystallization from equal parts of methanol and hydrochloric acid gave crystals melting at 150–151° to a turbid liquid which slowly became clear at that temperature. Analysis showed this behavior due to the existence of the compound as a hydrate.

Calculated for $C_{18}H_{34}N_2O_2 \cdot H_2O \cdot HCl$, mol. wt. 484.74:

|   | Calculated | Found |
|---|---|---|
| C | 69.32 | 69.1, 69.3 |
| H | 7.69 | 7.57, 8.18 |

Example 9

The preparation of 2-dimethylamino-4,4-diphenyl-5-(alpha-chloroacetoxy)-heptane hydrochloride having the formula:

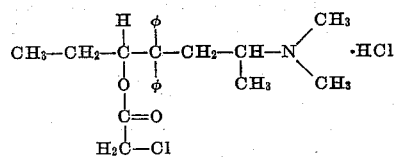

Five gm. (0.016 mole) of 2-dimethylamino-4,4-diphenyl-5-heptanol was dissolved in 50 ml. of anhydrous ethyl acetate. To the solution was added 3 gm. (0.027 mole) of chloracetyl chloride. This mixture was refluxed and in 5 min. crystals began to separate. The mixture was refluxed for one hour and then was cooled in an ice-bath. The crystals were filtered off and washed with several portions of ice-cold ethyl acetate. The crystals melted sharply at 195–196°.

Calculated for $C_{23}H_{30}NO_2Cl$:

|   | Calculated | Found |
|---|---|---|
| C | 65.06 | 64.80 |
| H | 7.36 | 7.43 |

Example 10

The preparation of ethyl-(2-dimethylamino-4,4-diphenyl-5-heptyl) carbonate hydrochloride having the formula:

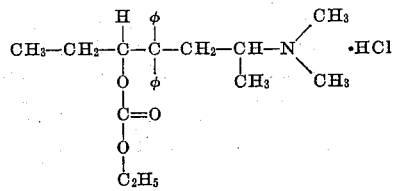

A solution of 4 gm. (0.013 mole) of 2-dimethylamino-4,4-diphenyl-5-heptanol in 50 ml. of ethyl acetate was refluxed for two hours with 3 gm. (0.028 mole) of ethyl chlorocarbonate. A portion of the solution crystallized when diluted with Skellysolve C. The original reaction mixture crystallized from ethyl acetate. Four grams of white crystals melting at 167–169° was obtained.

Calculated for $C_{24}H_{33}NO_3 \cdot HCl$:

|   | Calculated | Found |
|---|---|---|
| C | 68.70 | 68.70 |
| H | 8.17 | 8.18 |

*Example 11*

The preparation of 1-dimethylamino-3,3-diphenyl-4-hexanol nitrate having the formula:

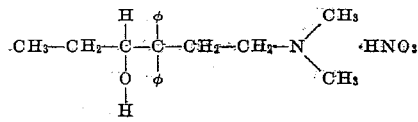

In 75 ml. of water was dissolved six grams of des-methyl amidone (1-dimethylamino-3,3-diphenyl-4-hexanone). To the solution was added 0.5 gram of Adam's platinum oxide catalyst. The compound was then hydrogenated in a Burgess-Parr reduction apparatus with an initial hydrogen pressure of 55 pounds. No hydrogen absorption was noted after the first hour although a three hour reaction period was allowed. The catalyst was removed by filtration and the filtrate made basic with 20% sodium hydroxide. The oil which separated was extracted with 500 ml. of diethyl ether in three portions. The extracts were dried over potassium carbonate and converted to the nitrate salt through the addition of concentrated acid with shaking to the ether solution filtered from the drying agent. The oil which separated was allowed to settle and the ether decanted. The oil was dissolved in hot isopropanol and the solution cooled. Plate crystals separated which were filtered off and twice more recrystallized from the same solvent. The product was then melted at 156–157°.

Calculated for $C_{20}H_{27}NO \cdot HNO_3$:

|   | Calculated | Found |
|---|---|---|
| C | 66.7 | 66.5, 66.4 |
| H | 7.84 | 8.22, 8.68 |

*Example 12*

The preparation of 2-dimethylamino-4-phenyl-4-cyclohexyl-5-heptanol having the formula:

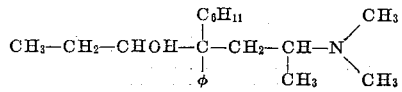

and corresponding phosphate salt.

Ten grams (0.029 mole) of amidone hydrochloride was dissolved in 80 ml. of glacial acetic acid and 1 gram of platinum oxide catalyst added. This mixture was shaken on a Burgess-Parr reduction apparatus at 50–60° with an initial hydrogen pressure of 55 pounds. Over a three day period a pressure drop of 12.5 pounds was observed. Complete reduction of both benzene rings and the carbonyl group would require a pressure drop of 17.6 pounds on the particular apparatus used. At this stage further addition of catalyst caused no additional uptake of hydrogen. The catalyst was then filtered off and the filtrate concentrated to one third its original volume. The solution was then made basic and the oil taken up in ether. The only salt obtainable in solid form was a phosphate. Repeated recrystallization of the material did not give material with a sharp melting point.

The ether solution of the base was then concentrated and the residual oil vacuum distilled. After a forerun to 150°, a fraction boiling at 150–153° at 1 mm. pressure was collected. The oil obtained was analyzed. Calculated on the basis of one benzene ring being reduced in addition to the carbonyl group the compound would have the following empirical formula and analysis.

Calculated for $C_{21}H_{35}NO$:

|   | Calculated | Found |
|---|---|---|
| C | 79.50 | 79.80 |
| H | 11.13 | 11.10 |

In contrast if both rings were reduced the following values express the theoretical composition of the molecule.

Calculated for $C_{21}H_{41}NO$:

|   | Calculated | Found |
|---|---|---|
| C | 78.2 | 79.80 |
| H | 12.78 | 11.10 |

*Example 13*

The preparation of 1-morpholino-3,3-diphenyl-4-hexanol having the following formula:

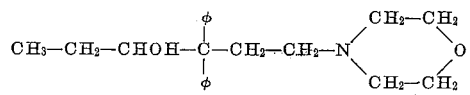

A solution of 10 grams (0.028 mole) of 1-morpholino-3,3-diphenyl-4-hexanone hydrochloride in 120 ml. of distilled water was placed in a reduction bottle with 0.2 grams of Adam's platinum oxide catalyst. The compound was hydrogenated in a Burgess-Parr apparatus with an initial hydrogen pressure of 55 pounds. In approximately 3 hours less than 50% of the theoretical pressure drop for complete reduction of the carbonyl group had occurred. The spent catalyst was filtered off and 0.2 gram of fresh platinum oxide catalyst added. On rehydrogenation the theoretical pressure drop was observed in one hour. The catalyst was then filtered off and the filtrate made basic with 40% sodium hydroxide solution. The heavy oil which separated was extracted with ether and the ether extracts dried over potassium carbonate. Of various salts investigated only the nitrate could be crystallized. However, a portion of the ether solution was evaporated to dryness and the oil resulting crystallized. Recrystallization of the base from cyclohexane gave material melting at 128–131°. Another recrystallization from the same solvent gave large crystals melting at 130–131°.

Calculated for $C_{22}H_{29}NO_2$:

|   | Calculated | Found |
|---|---|---|
| C | 77.80 | 77.7 |
| H | 8.63 | 8.89 |

The remainder of the base in ether was converted to the nitrate through the dropwise addition of the concentrated acid to the ice cold ether solution. The oil which settled was separated from ether through decantation and then dissolved in a minimum of boiling isopropanol. The crystals which separated on cooling melted at 185–186°.

Calculated for $C_{22}H_{29}NO_2 \cdot HNO_3$:

|   | Calculated | Found |
|---|---|---|
| C | 65.70 | 65.5 |
| H | 7.48 | 7.31 |

*Example 14*

The preparation of 2-morpholino-4,4-diphenyl-5-heptanol having the formula:

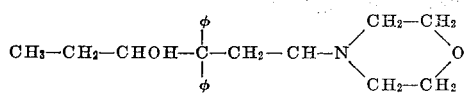

One hundred grams (0.228 mole) of 2-morpholino-4,4-diphenyl-5-heptanone hydrobromide was suspended in 500 ml. of water and 200 ml. of 40% sodium hydroxide was added. The base was extracted into 2 liters of ether in 5 portions and saturated with dry hydrogen chloride. The heavy white precipitate which separated was recrystallized from isopropanol. Yield 88 gm. Theory 88.5 gm. The product melted at 222–223°.

Calculated for $C_{23}H_{29}NO_2 \cdot HCl$:

|   | Calculated | Found |
|---|---|---|
| C | 71.18 | 71.50 |
| H | 7.78 | 7.64 |

Ten grams (0.025 mole) of 2-morpholino-4,4-diphenyl-5-heptanone hydrochloride was dissolved in 150 ml. of distilled water. The solution was placed on the Parr reduction apparatus after addition of 0.30 gm. of Adam's platinum oxide catalyst (American Platinum Works). A drop in hydrogen pressure corresponding to the theoretical amount needed for reduction of the carbonyl group was observed in two hours. The catalyst was filtered off and the filtrate made basic. The oil soon crystallized and was recrystallized from methanol. The yield obtained through combining the first crop of crystals with a second crop resulting after concentration of the mother liquor was 8.5 gm. or 96%. The crystals melted at 118–119°.

Calculated for $C_{23}H_{31}NO_2$:

|   | Calculated | Found |
|---|---|---|
| C | 78.30 | 78.10 |
| H | 8.85 | 8.83 |

The base dissolved in 300 ml. of dry ether and was saturated with dry hydrogen chloride. The white precipitate was filtered off and recrystallized from 700 ml. of anhydrous ethyl acetate. The long rectilinear crystals were filtered off and the mother liquors concentrated to 200 ml. Both crops of crystals melted at 225–226°. The yield was 9 gm. or 92.7% of theory on the basis of ketone starting material.

Calculated for $C_{23}H_{31}NO_2 \cdot HCl$:

|   | Calculated | Found |
|---|---|---|
| C | 70.8 | 70.8 |
| H | 8.33 | 8.23 |

*Example 15*

The preparation of 2-morpholino-4,4-diphenyl-5-acetoxy-heptane hydrochloride having the formula:

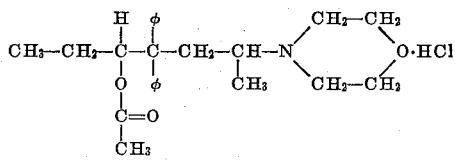

A solution of 5 gm. (0.014 mole) of 2-morpholino-4,4-diphenyl-5-heptanol in 50 ml. of dry benzene was treated with 5 gm. (excess) of acetyl chloride. The mixture was refluxed for one and one half hours and was then cooled. Crystals separated which after recrystallization from methyl isobutyl ketone melted at 221–222°. Yield 3 gm.

Calculated for $C_{25}H_{33}NO_3 \cdot HCl$:

|   | Calculated | Found |
|---|---|---|
| C | 69.46 | 69.50 |
| H | 7.94 | 8.22 |

The preparation of 2-morpholino-4,4-diphenyl-5-acetoxy heptane: A solution of 2-morpholino-4,4-diphenyl-5-heptanol in dry benzene was reacted as above. The benzene was distilled off, dilute alkali added and the oil extracted into ether. The ether solution was concentrated and the oil crystallized. Two recrystallizations from ethanol gave a product melting at 100–101°.

Calculated for $C_{25}H_{33}NO_3$:

|   | Calculated | Found |
|---|---|---|
| C | 75.89 | 75.70 |
| H | 8.41 | 8.29 |

*Example 16*

The preparation of alpha, alpha, diphenyl-gamma - morpholino - valeronitrile and alpha, alpha-diphenyl - beta - methyl-gamma-morpholinobutyronitrile.

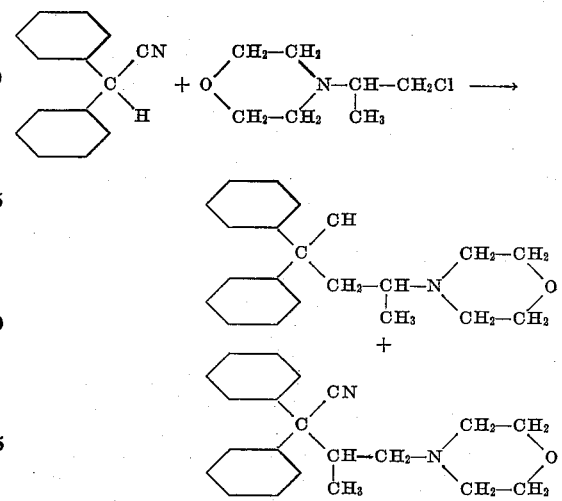

A mixture of 41.4 gm. (1.8 mole) of lithium amide, 289 gm. (1.5 mole) of diphenylacetonitrile and 500 ml. of anhydrous benzene was refluxed in all glass apparatus for 16 hours. To this mixture was added a solution of beta-morpholinopropyl chloride prepared from 318 gm. (1.6 mole) of beta-morpholinopropyl chloride hydrochloride.

(Prepared according to the method described in Office of the Publication Board, Department of Commerce, Washington, D. C., report number PB-981 (page 96, No. 1) dated July 1945, with morpholine substituted for dimethylamine.) The halide was added in solution in 500 ml. of benzene. The mixture was refluxed for eight hours and then cooled. Ice was added to the mixture with stirring. The two layers were then transferred to a separatory funnel and shaken well. The benzene layer was further washed with two 200 ml. portions of water. After drying over potassium carbonate the benzene solution was concentrated and last traces of solvent removed under reduced pressure. The residue became partly crystalline on standing. Yield: 479 gm., 90.4%. A portion of the material was pressed on filter paper to remove oil and was then recrystallized from ethyl alcohol. The crystals obtained melted from 99–102°. A second recrystallization did not alter this value.

Calculated for $C_{21}H_{24}N_2O$:

|   | Calculated | Found |
|---|---|---|
| C | 78.75 | 78.68 |
| H | 7.55 | 7.00 |

*Example 17*

The preparation of 2-morpholino-4,4-diphenyl-5-heptanone, 1-morpholino-3,3-diphenyl-2-methyl-4-hexanone and related derivatives. A solution of 320 gm. (1 mole) of the isomeric nitriles; alpha, alpha-diphenyl-gamma-morpholino-valeronitrile, and alpha, alpha-diphenyl-beta-methyl-gamma-morpholinobutyronitrile, in 400 ml. of dry xylene was added to a solution of ethyl magnesium bromide. The ethyl magnesium bromide solution was prepared from 48 gm. (2 mole) of magnesium metal and 218 gm. (2 mole) of ethyl bromide with 500 ml. of dry ether as a solvent. All operations were carried out in a dry nitrogen atmosphere. After the addition of the Grignard reagent to the nitrile, the mixture was refluxed for six hours. The greenish reaction mixture was then poured as rapidly as possible into a 4-liter beaker containing 1-liter of water and 500 ml. of concentrated hydrochloric acid. An exceedingly vigorous reaction followed. When the mixture had cooled somewhat 500 ml. of benzene was added and after stirring, three layers separated. In a few hours the heavy red middle layer sank to the bottom and began to crystallize. After 48 hours the mixture was filtered and pressed as dry as possible. The brown solid remaining in the funnel was washed with ether, air dried to remove the solvent and then recrystallized from 1500 ml. of water. The yield of crystals obtained was 235 gm. (theoretical yield of one isomer 216.1 gm.). The material was then recrystallized from isopropanol in two portions. The total volume of solvent used was 2,440 ml. The yield of crystals obtained was 171 gm. which was 79.3% of theory. The filtrates from both water and isopropanol recrystallizations were investigated for the other isomer expected in the reaction. However, this first fraction of product obtained melted at 230–231° and further recrystallizations from water or isopropanol did not alter the value. As the resulting compound was shown by analysis to be a ketone, it was assigned the following structure.

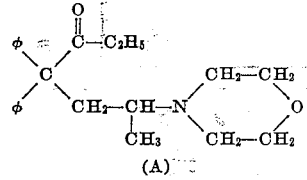
(A)

Calculated for $C_{23}H_{29}NO_2 \cdot HBr$:

|   | Calculated | Found |
|---|---|---|
| C | 63.83 | 63.7 |
| H | 6.99 | 6.84 |

The filtrate obtained on removal of the solid obtained on hydrolysis of the original reaction mixture consisted of a benzene layer and an acid layer. The benzene layer was extracted with 500 ml. of 4 normal hydrochloric acid and the extracts added to the acid layer of the filtrate. The combined acid solutions were made basic and extracted with benzene. The extracts, about one liter in volume, were dried over potassium carbonate and concentrated. The heavy oil which remained recrystallized well from Skellysolve C. The rectilinear crystals obtained melted at 104–105°. As the product reacted rapidly with acetyl chloride to give an acetylimine, the product was assigned the following structure.

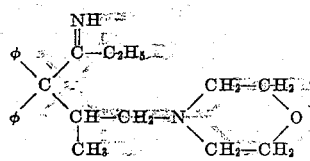
(B)

Calculated for $C_{23}H_{30}N_2O$:

|   | Calculated | Found |
|---|---|---|
| N | 7.99 | 8.03 |

The filtrate from the water recrystallization of the product assigned structure (A) was made basic and a heavy oil separated. This oil was taken up in boiling ethanol and cooled. Crystals separated which melted at 135–136°. After recrystallization from Skellysolve C they melted sharply at 139–140°. The yield obtained was 35 gm. It was shown by acid hydrolysis of 2 gm. of the imine assigned to structure (B) that a base was obtained melting at 139–140°. The base melted undepressed at 139–140° when mixed with a sample of the material obtained from the recrystallization mother liquors. Thus the product was assigned the following structure (C).

Calculated for $C_{23}H_{29}NO_2$:

|   | Calculated | Found |
|---|---|---|
| C | 78.58 | 78.80 |
| H | 8.34 | 7.48 |

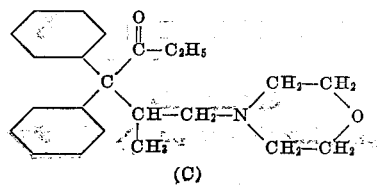
(C)

Example 18

The preparation of 2-morpholino-4,4-diphenyl-5-chloroacetoxyheptane hydrochloride having the formula:

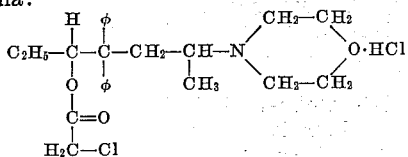

Five grams (0.014 mole) of 2-morpholino-4,4-diphenyl-5-heptanol in 50 ml. of anhydrous ethyl acetate was treated with 5 gm. (excess) of chloroacetyl chloride. The mixture was boiled for one hour, cooled and filtered. The crystals were dissolved in methyl isobutyl ketone and after two recrystallizations from this solvent melted at 195–196°.

Calculated for $C_{24}H_{32}NO_3Cl \cdot HCl$:

|   | Calculated | Found |
|---|---|---|
| C | 64.30 | 63.90 |
| H | 7.14 | 7.28 |

Example 19

The preparation of the carbinol of isoamidone, having the formula:

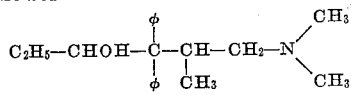

A solution of 23 gm. (0.06 mole) of 1-dimethylamino-2-methyl-3,3-diphenyl-4-hexylideneimine dihydrochloride was prepared in 200 ml. of concentrated hydrochloric acid and 50 ml. of water. This solution was refluxed for 48 hours to yield a solution of the corresponding ketone hydrochloride. The free base was liberated through addition of concentrated sodium hydroxide. The base was extracted into 800 ml. of ether. The solution of 1-dimethylamino-2-methyl-3,3-diphenyl-4-hexanone was dried over potassium carbonate and was then shaken for 2 hours with potassium hydroxide pellets. The dried solution was then added dropwise to a solution of 2.5 gm. (0.067 mole) of lithium aluminum hydride in 300 ml. of anhydrous ethyl ether. The reaction was moderately exothermic and the solvent boiled gently. After the addition the mixture was refluxed for 18 hours and was then cooled. Ice-water was added dropwise until no further evolution of hydrogen was noted. The mixture was then poured into a separatory funnel and 200 ml. of 20% sodium hydroxide added. The ether layer was separated and later combined with 500 ml. of ether used to extract the water layer in three portions. The combined ether solutions were dried over potassium carbonate, filtered and saturated with dry hydrogen chloride. The oily material which separated crystallized on boiling with anhydrous ethyl acetate. The product crystallized as long hair-like needles which melted at 203–204° to an oil which immediately crystallized. The material again melted at 236–237°.

The material was submitted for analysis.

Calculated for $C_{21}H_{29}NO \cdot HCl$:

|   | Calculated | Found |
|---|---|---|
| C | 72.46 | 71.8 |
| H | 8.68 | 8.69 |

The free base was isolated as crystals from Skellysolve C melting at 108–110°.

Calculated for $C_{21}H_{29}NO$:

|   | Calculated | Found |
|---|---|---|
| C | 80.95 | 80.80 |
| H | 9.37 | 9.59 |

Example 20

The preparation of the acetate of isoamidol having the formula:

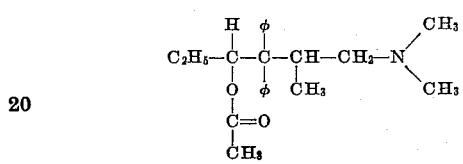

Five gm. (0.016 mole) of 1-dimethylamino-2-methyl-3,3-diphenyl-4-hexanol hydrochloride was dissolved in water and excess of 20% sodium hydroxide added. The dry base was isolated through extraction with ether, drying over potassium carbonate and concentration of the ether solution. The oil remaining was dissolved in 50 ml. of ethyl acetate and 3 gm. (0.038 mole) of acetyl chloride added. The mixture was refluxed for two hours and cooled. The crystals which slowly separated were filtered off after 24 hours. Five gm. of product melting at 228–229° was obtained.

Calculated for $C_{23}H_{31}NO_2 \cdot HCl$:

|   | Calculated | Found |
|---|---|---|
| C | 70.8 | 70.8, 70.7 |
| H | 8.26 | 8.40, 8.45 |

In addition to the compounds described above other organic carbinols and esters thereof are included within the scope of this invention which can be prepared according to the above methods are:

2-dimethylamino-4,4-diphenyl-5-chloroacetoxy hexane hydrochloride, 1-dimethylamino-2-methyl-3,3-diphenyl-4-chloroacetoxypentane hydrochloride, 2-dimethylamino-4,4-diphenyl-5-(beta-chloropropionoxy)-heptane hydrochloride, 2-dimethylamino-4,4-diphenyl-5-(alpha-chloropropionoxy)-heptane hydrochloride, 2-dimethylamino-4,4-diphenyl-5-dichloroacetoxy heptane hydrochloride, 2-dimethylamino-4,4-diphenyl-5-trichloroacetoxy heptane hydrochloride, 2-dimethylamino-4,4-diphenyl-5-iodoacetoxy heptane hydrochloride, 2-dimethylamino-4,4-diphenyl-5-dibromoacetoxy heptane hydrochloride, 2-dimethylamino-4,4-diphenyl-5-methoxy-heptane hydrochloride, 2-dimethylamino-4,4-diphenyl-5-ethoxyheptane hydrochloride, 2-dimethylamino-4,4-diphenyl-5-(beta-chloroethoxy) heptane hydrochloride, 2-(N-morpholinyl)-4,4-diphenyl-5-ethoxyheptane hydrochloride, 1-(N-morpholinyl)-4,4-diphenyl-5-ethoxyheptane hydrochloride, ethyl-2-(N-morpholinyl(-4,4-diphenyl-5-heptyl carbonate hydrochloride, beta-chloroethyl 2-(N-morpholinyl)-4,4-diphenyl-5-heptyl carbonate hydrochloride, beta-chloroethyl 1-N-morpholinyl-3,3-diphenyl-4-hexyl carbonate hydrochloride, beta-chloroethyl 1 - dimethylamino - 3,3 - diphenyl-4-hexyl carbonate hydrochloride, N-ethyl 2-dimethylamino-4,4-diphenyl-5-heptyl carbamate hydrochloride, N-methyl 1-dimethylamino-2-methyl-3,3-diphenyl-4-hexyl carbamate hydrochloride, 2-dimethylamino-4,4-diphenyl-5-heptyl carbamate hydrochloride, 1-dimethylamino-2-methyl-3,3-diphenyl-4-hexyl carbamate hydrochloride, 1-(N-pyrrolidyl-2-methyl-3,3-diphenyl-4-acetoxy-hexane hydrochloride, 2-(N-pyrrolidyl)-4,4-diphenyl-5-acetoxyheptane hydrochloride, 2-(N-pyrrolidyl)-4,4-diphenyl-5-chloroacetoxyheptane hydrochloride, 2-(N-pyrrolidyl)-4,4-diphenyl-5-chloroacetoxyhexane hydrochloride, 2-(N-pyrrolidyl) - 4,4 - diphenyl - 5 - chloroacetoxyoctane hydrochloride, 3-(N-pyrrolidyl)-5,5-diphenyl - 6 - chloroacetoxyoctane hydrochloride, 3 - dimethylamino-5,5-diphenyl-6-chloracetoxyoctane hydrochloride, 2 - dimethylamino - 3-methyl-4,4-diphenyl-5-acetoxy heptane hydrochloride, 2-dimethylamino-4,4-diphenyl-5-butyroxyheptane hydrochloride, 2-(N-piperidyl)-4,4-diphenyl-5-chloroacetoxyheptane hydrochloride, 1-(N-piperidyl)-2-methyl-3,3-diphenyl - 4 - acetoxy hexane hydrochloride, 2-(N-alpha-picolyl)-4,4-diphenyl-5-chloroacetoxyheptane hydrochloride, 2-(N-beta-picolyl)-4,4-diphenyl-5-chloroacetoxyheptane hydrochloride, 2-(N-gamma-picolyl)-4,4-diphenyl - 5 - chloroacetoxyheptane hydrochloride, 2-diethylamino - 4,4 - diphenyl-5-acetoxyheptane hydrochloride, 2-dipropylamino-4,4-diphenyl-5-acetoxyheptane hydrochloride, 2-di-n-butylamino-4,4 - diphenyl - 5 - acetoxyheptane hydrochloride, 2-di-isobutylamino-4,4-diphenyl-5-acetoxyheptane hydrochloride, 1-dimethylamino-4,4-diphenyl - 5 - acetoxyheptane hydrochloride, 2-isopropylamino-4,4-diphenyl-5-acetoxyheptane hydrochloride, 2-dimethylamino-4-(para-chlorophenyl) - 4 - phenyl - 5 - acetoxyheptane hydrochloride, 1-dimethylamino-2-methyl-4-(para-chlorophenyl) - 4 - phenyl - 5-acetoxyheptane hydrochloride, 2-(N-morpholinyl)-4-(para-chlorophenyl)-4 - phenyl - 5 - acetoxyheptane hydrochloride, 1-(N-morpholinyl)-4 - (para - chlorophenyl) - 4 - phenyl - 5 - acetoxyheptane hydrochloride, 2-(N-pyrrolidyl)-4-(para-chlorophenyl)-4-phenyl - 5 - acetoxyheptane hydrochloride, 2-dimethylamino-4,4-(dipara-chlorophenyl) - 5 - acetoxyheptane hydrochloride, 2 - dimethylamino - 4 - (ortho - chlorophenyl-4-phenyl - 5 - acetoxyheptane hydrochloride, 2-dimethylamino-4,4-(di-orthochlorophenyl)-5-acetoxyheptane hydrochloride, 2-dimethylamino - 4 - (para - bromophenyl) - 4 - (ortho-bromophenyl)-5-acetoxyheptane hydrochloride, 1-dimethylamino-2-methyl - 3 - (para - methoxyphenyl)-3-phenyl-4-acetoxyhexane hydrochloride, 2-dimethylamino-4,4-di-(meta-methoxyphenyl)-5-chloroacetoxyheptane hydrochloride, 2-dimethylamino-4,4-di - (meta - hydroxyphenyl)-5-chloroacetoxyheptane hydrochloride, 2-N-morpholinyl-4,4 - di - (meta-hydroxyphenyl)-5-chloroacetoxyheptane hydrochloride, 2 - (N-pyrrolidyl)-4,4-di-(meta - hydroxyphenyl) - 5- chloroacetoxyheptane hydrochloride, 2-(N-pyrrolidyl) - 4,4 - di - (orthotolyl) - 5 - acetoxyheptane hydrochloride, 2-dimethylamino-4,4-di-(para-tolyl)-5-bromoacetoxyheptane hydrochloride, 2-dimethylamino-4-benzyl - 4 - phenyl - 5 - acetoxyheptane hydrochloride, 2-dimethylamino-4,4-dibenzyl - 5 - acetoxyheptane hydrochloride, 1-dimethylamino-3,3-dicyclopentyl-5-acetoxyhexane hydrochloride, 1 - dimethylamino-3,3-diphenyl-4-acetoxynonane hydrochloride, 1- dimethylamino-3-phenanthryl - 3 - phenyl - 4-acetoxyhexane hydrochloride, 1-dimethylamino-3-naphthyl-3-phenyl - 4 - acetoxyhexane hydrochloride, 1-dimethylamino-3-(alpha - pyridyl)-3-phenyl-4-acetoxyhexane hydrochloride, 2-dimethylamino - 4,4 - di-(alpha-pyridyl) - 5 - acetoxyheptane hydrochloride, 2 - dimethylamino-4-phenyl-4-(alpha-pyrimidyl) - 5 - acetoxyheptane hydrochloride, 2-dimethylamino-4,4-di-(alpha-pyrimidyl) - 5 - acetoxyheptane hydrochloride, 1 - dimethylamino - 3 - phenyl - 3 - (alpha-thienyl)-4-acetoxy hexane hydrochloride, 2-dimethylamino-4-phenyl - 4 - (alpha-thienyl) - 5-acetoxy heptane hydrochloride, 2-dimethylamino-4-phenyl-4-(alpha-thienyl) - 5 - chloroacetoxyheptane hydrochloride, 2-(N-morpholinyl)-4-phenyl-4 - (alpha-thienyl) - 5 - chloroacetoxy heptane hydrochloride, 2-dimethylamino-4,4-di-(alpha-thienyl)-5-chloroacetoxy heptane hydrochloride, 2-dimethylamino - 4,4 - di - (beta-thienyl)-5- chloroacetoxyheptane hydrochloride.

The above description and examples are intended to be illustrative only. Any modification of or variation therefrom which conforms to the spirit of the invention is intended to be included within the scope of the claims.

I claim:

1. A member selected from the group consisting of (a) compounds having the formula

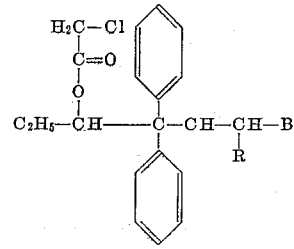

wherein R is a member selected from the group consisting of methyl and hydrogen and B is a member selected from the group consisting of dimethylamino and morpholino and (b) acid addition salts thereof.

2. A compound having the formula

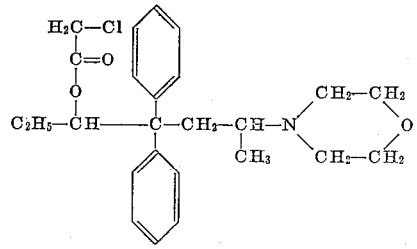

3. A compound having the formula

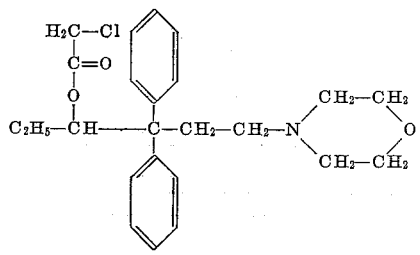

4. A compound having the formula
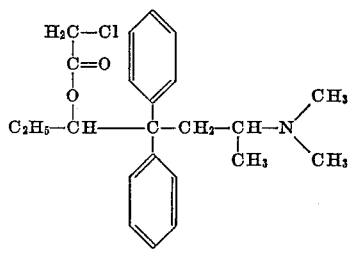
MERRILL E. SPEETER.
References Cited in the file of this patent
UNITED STATES PATENTS
| Number | Name | Date |
|---|---|---|
| 2,368,073 | Tyron | Jan. 23, 1945 |
| 2,431,285 | Suter et al. | Nov. 18, 1947 |
| 2,477,842 | Wenner | Aug. 2, 1949 |
FOREIGN PATENTS
| Number | Country | Date |
|---|---|---|
| 24,631 | Great Britain | of 1903 |
OTHER REFERENCES
Richter-Text Book of Organic Chemistry, 1938 ed., John Wiley and Sons, Inc., New York, pp. 82–85 and 96–97.